United States Patent [19]

Osajima et al.

[11] Patent Number: 4,853,231

[45] Date of Patent: Aug. 1, 1989

[54] METHOD FOR PREPARATION OF TASTABLE MATTERS CONSISTING PRIMARILY OF LOW MOLECULAR WEIGHT PEPTIDES

[76] Inventors: Kazuharu Osajima, 1037-8, Minomicho, Fukuyama 720; Katsuhiro Osajima, 222-4, Oaza-Yashiro, Yahatahama 796, both of Japan

[21] Appl. No.: 43,922

[22] Filed: Apr. 29, 1987

[30] Foreign Application Priority Data

Apr. 29, 1986 [JP] Japan ............................... 61-098903

[51] Int. Cl.$^4$ .......................... C12P 21/06; A23J 1/02; A23J 1/04; A23L 1/31
[52] U.S. Cl. .......................................... 426/7; 426/59; 426/63; 426/657; 435/69
[58] Field of Search .................. 426/59, 56, 7, 46, 55, 426/656–657, 63; 435/70, 71, 68–69

[56] References Cited

U.S. PATENT DOCUMENTS 3,928,630 12/1975 Perini ..................................... 426/59
3,932,671 1/1976 Yokotsuka et al. ..................... 426/7
4,452,888 6/1984 Yamazaki et al. ..................... 426/46

Primary Examiner—Marianne Cintins
Attorney, Agent, or Firm—R. A. Giangiorgi

[57] ABSTRACT

Tastable matters consisting mainly of low molecular weight peptides are obtained from raw material meats of fishes, shellfishes, birds, beasts or whales, by a method including a step of finely pulverizing the raw material meat followed by decomposing the pulverized meat with the autolyzing enzymes of the said meat material, a step of adding other protein-decomposing enzymes when the autolyzing reaction speed has reached the maximum value so that the protein-decomposition reactions by the added enzymes and the previous autolyzing enzymes may proceed simultaneously, and a step of deactivating the both enzymes followed by purification and concentration of the resulting low molecular peptide-containing tastable matter. In order to impove the quality of the tastable matter thus obtained, the reaction solution as obtained in the previous autolysis step and an amino acid are added to the concentrated low molecular peptide-containing solution and again reacted therebetween and then the enzymes used are deacrivated, or alternatively, an amino acid only is added to the freshly purified low molecular peptide-containing solution and reacted whereupon the solution is continuously stirred without the liquid temperature thereof being lowered. The tastable matters thus obtained have the native aroma and umami of the raw material meats.

21 Claims, No Drawings

METHOD FOR PREPARATION OF TASTABLE MATTERS CONSISTING PRIMARILY OF LOW MOLECULAR WEIGHT PEPTIDES

FIELD OF THE INVENTION

The present invention relates to a method for preparation of highly tastable peptides and, more precisely, to a method for preparation of tastable matters consisting mainly of peptides, which have a molecular weight falling within a low molecular range and which are obtained by decomposition of proteins in fishes and shellfishes or in meats of birds, beasts and whales, and/or composite substances comprising the said peptides and amino acids, the tastable matters being able to be added to various processed foods, nutrient foods, seasonings, dietary food, etc. and additionally being valuable for effectively utilizing marine products and livestock products.

BACKGROUND OF THE INVENTION

Proteins which are the main component in meats are high molecular compounds of α-amino acids which are bonded by peptide bonds, and the molecular weight thereof is said, in general, to be 5,000 or more. It is apparent from experience that most of the components of "umami" (flavour enhancer) are in proteinous foods.

However, peptides in the state of a high molecular form are, though being rich in the native aroma of natural proteins, poor in the umami for instance, as anyone would so feel when he ate "sashimi" (slices of raw fish) of freshly caughed raw fishes or "beef mizutaki" (beef boiled plain), because the peptides in the said state could not release the components of umami therefrom.

Under the circumstances, a method of decomposing proteins for the purpose of flavour-enchancement of the components of umami has heretofore been proposed, and hydrolysis of proteins with an acid or alkali and decomposition thereof with an enzyme have been tried therefor. The former method of hydrolysis has an extremely limited utilizable range as the concentration of the salts formed is extremely high, and the detail thereof is not described herein. The latter method of decomposition with enzymes, to which the present invention belongs, is described hereinafter.

Various kinds of enzymes exist in tissues and digestive organs of animal meats, and these act for autolytic decomposition of proteins and fats. However, these include proteases, proteinases, peptidases, etc. as protein-decomposing enzymes, in mixture, and most of them individually have a high substrate specificity and the concentration of each enzyme and the reaction speed thereof are not uniform but are poor in the regularity. Accordingly, the molecular weight distribution of the decomposed solution is broad, randomly including high molecular peptides and components of an amino acid level, and this does not have any specific peak. This is proved by the molecular weight presumption by gel-chromatography of the decomposed solution with Sephadex G-50, whereupon an eluted curve is obtained, broadly extending in the total range of from a molecular weight of 1,500 to that of 30,000 which is the fractionation range of peptides and spherical proteins with the Sephadex G-50.

After the proteins are decomposed to the level of amino acids, the decomposed proteins may have the umami whilst not only these will lose the native aroma, taste and flavour of natural proteins but also these will have so-called strong amino acid odor or other offensive odor or will become highly bitter or rough.

Under the situation, the present inventors already proposed a means of overcoming the defect of the decomposition of proteins by autolysis only in Japanese Patent Publication No. 30344/55, where proteins are first completely autolyzed and decomposed and then the autolyzing enzymes are deactivated and desired amino acids are added so that the bitterness, roughness are some offensive odors are eliminated.

Further, the present inventors tried the following presumption in consideration of the above-mentioned known facts.

In the stage of high molecular weight peptides which is the initial stage of the protein decomposition, the aroma of raw material meats can be sustained but the umami cannot be derived from the meats, whilst in the level of amino acids which is the terminal stage of the protein decomposition, the umami can be derived but not only the native aroma of meats is lost but also the decomposed meats are to have some special bitterness, roughness and some other offensive odor which would deteriorate the umami.

Accordingly, it is presumed that the highest deliciousness capable of sustaining the native aroma of raw material meats while keeping the umami thereof would be obtained in the intermediate state of the said two stages, or that is, in the intermediate between the level of high molecular weight peptides and that of amino acids, which comprises peptide-bonded substances having a low molecular weight falling within a range of from 200 to 3000, especially in the concentrated formation of the said substances.

For the condition to realize the said presumption, the present inventors planned to add some other protein-decomposing enzymes besides the autolyzing enzymes, and as a first step, tried to make an experiment where the autolyzing enzymes are deactivated by heating or the like, after the completion of the autolysis therewith, and then other protein-decomposing enzymes are added anew.

As a result of the said experiment, it was found that in the above-mentioned addition method, the raw material meats are coagulated and dehydrated by the heating whereby the effective surface area of the meats to the enzyme reaction would decrease to result in the reduction of the enzyme reaction efficiency and the reduction of the yield thereof, while the molecular weight distribution of the products would often be uneven and most of the products would be bitter, and therefore, the resulting products would be unsuitable for umami seasonings or materials of foods.

In the above-mentioned case, even though exo-type protein-decomposing enzymes (belonging to a type capable of cutting a protein from the end chain thereof to decompose it into the constitutional amino acids), which may form a relatively small bitterness, were used, the formation of low molecular pepetides wall small but the meats were decomposed into the constitutional amino acids and other long chain and high molecular weight proteins.

Next, the present inventors tried to add other enzymes in the active stage of the autolyzing enzymes, expecting the synergestic composite reaction of the both enzymes. In the trial, three methods were repeatedly tested where the time of the addition of the enzymes was varied to be the initial, intermediate or terminal stage of the decomposition reaction, and as a result of the trial tests, the present invention has been achieved.

One object of the present invention is to achieve a method for preparation of tastable matters consisting mainly of low molecular weight peptides which have both the aroma and the umami.

Another object of the present invention is to provide tastable matters which can be utilized as extremely excellent food additives or seasonings.

SUMMARY OF THE INVENTION

Above objects of the present invention are achieved by the following steps, which comprise a step of finely pulverizing a raw material meat by mechanical means followed by processing the pulverized meat material with the autolyzing enzymes of the said material for the protein decomposition reaction under a desired condition, a step of adding other protein-decomposing enzymes of a desired kind in a desired amount when the autolyzing reaction rate has reached the maximum value so that the protein-decomposition reaction by the added enzymes and the previous autolyzing enzymes may proceed simultaneously under a desired condition, and a step of deactivating the both enzymes followed by purification and concentration of the resulting low molecular weight peptide-containing tastable matters.

In the initial stage, the raw material meats begin to be decomposed by the action of the autolyzing enzymes in the meats whereby the water-soluble sarcoplasm proteins filling the myoplasm in the form of a spherical colloidal solution are first dissolved out. Then, the myofibril proteins and meat substrate proteins are exposed so that these can easily be decomposed.

However, if the raw material meats are to be decomposed only by the autolyzing enzymes therein, high molecular peptides would remain without being decomposed, as mentioned above, and as a result, the meat matters which could not be decomposed so much, for example, the above-mentioned myofibril proteins and meat substrate proteins would remain as such.

Accordingly, the addition of other enzymes which are suitable for the decomposition of the above-mentioned remained meat matters (high molecular peptides) is necessary when the autolyzing reaction rate has reached the maximum value, whereby the enzymes added may react the remained meat matters to decompose the same and thus decomposed matters become to have a lower molecular weight.

According to the said decomposition reaction, the high molecular weight peptides can uniformly be converted into peptides having a low molecular weight range by the complementary synergistic action of the autolyzing enzymes and the added enzymes, whereby the resulting concentrated solution can have an extremely large amount of low molecular weight peptides.

In case the concentrated solution thus formed is still bitter or rough, the previous decomposition reaction solution containing the activated autolyzing enzymes is again reacted with the said concentrated solution while any desired amino acids to be bonded are added thereto so as to be bonded with the low molecular peptides, whereby the bitterness and the roughness in the solution can completely be removed and the taste of the solution can be improved further.

The above-mentioned step is an application of Plastein Reaction, which composes synthesizing proteinaceous substances from low molecular weight peptides with a protease catalyst. In the method of the present invention, any expensive endopeptidase is not specifically utilized but the autolyzing enzyme-containing reaction solution, which is obtainable in the previous reaction step, can be partly added, or without the addition of the said reaction solution, an amino acid can be bonded to the low molecular weight peptides by suitably regulating the reaction condition.

In the case of improving and enriching the taste of the peptide-containing solution without the use of the autolyzing enzymes, the peptide concentration and the reaction temperature are to be elevated higher than those in the above-mentioned method, and further, the reaction is required to be initiated, while the peptides still activate, after the completion of the concentration treatment.

According to this method, the concentration of the peptides and amino acids contained in the resulting solution is high, and therefore, it is presumed that not only covalent bond but also hydrogen bond and ionic bond would be formed between them.

Stirring the concentrated solution without the temperature-drop, the addition of the desired amino acids only thereinto just after formed, whereby bonding the amino acids with the peptides is effective for removing the bitterness and roughness of the solution.

As explained in detail hereinafter, the method of the present invention is characterized by the addition of other enzymes which can react on a meat of such kind as containing peptide bonds that could not be cut by the autolyzing enzymes contained in the raw material meat, during the procedure of the autolysis reaction, especially when the reaction rate of the said autolysis reaction has reached the maximum value, while the protein-decomposing activity of the said autolyzing enzymes as existing in the raw material meat is being kept active. By the addition of the said enzymes, the complementary and synergestic effect of the autolyzing enzymes and the added enzymes can realize the uniform protein-decomposition of the raw material meat, whereby high molecular peptides of various kinds as contained in the raw material meat are converted into peptides having a molecular weight of a low molecular weight range. Thus, the present inventors have achieved the formation of a reaction solution containing an overwhelming majority of low molecular weight peptides and thus have achieved the formation of tastable matters which satisfy the initial object of the present invention and which have both the aroma and the umami of the raw material meats.

In addition, if the tastable matters thus obtained are still bitter or rough, the bitterness or roughness can completely be eliminated by the addition of both the reaction solution of the autolyzing enzymes and an amino acid or by the single addition of an amino acid only to the said tastable matter.

Accordingly, the tastable matters as obtained by the method of the present invention can be utilized as extremely excellent food additives or seasonings. In addition, the method of the present invention is valuable for effective utilization of various kinds of raw meat materials.

DESCRIPTION OF PREFERRED EMBODIMENTS

Any and every fishes and shellfishes or meats of birds, beasts and whales can be used as the raw material in the method of the present invention, and the raw material is processed with a meat-cutter or mincing machine so as to separate the meat matters from the raw material. The thus separated meat matters can be used directly, or if necessary, these may rapidly be frozen with a cooled air at about −20° C. to −50° C., stored at −20° C. to −30° C. and then used case by case in need thereof.

After the raw material meats are pulverized, water is added thereto in an amount that the stirring and decomposition of the meats can smoothly be carried out in a stirring and decomposing chamber (for example, 50 to 200% of the meats), the pH of the resulting solution is adjusted to be acidic or slightly acidic (for example, pH of from 3 to 7.0, which varies depending upon the kind of the raw material used), and the solution is stirred while kept to have a temperature of from 0° to 60° C., preferably from 40° to 55° C.

The water-soluble sarcoplasm proteins are dissolved out with the progress of the autolysis of the raw material meats, whereby the disintegration and dispersion of the raw material meats are accelerated and the raw material solution in the chamber becomes to be more fluid and then becomes to be uniformly liquefied. The reaction condition in the initial stage of the decomposition reaction is extremely important, because the myofibril proteins or the meat substrate proteins are slightly denaturated under heat after the dissolution of the water-soluble sarcoplasm proteins filling the myoplasm of the raw material meat in the form of a spherical colloidal solution therein, so that these can be decomposed with ease by the action of the autolyzing enzymes or other protein-decomposing enzymes to be added thereto in the next step. Accordingly, the temperature control is necessary to be carried out severely. The stirring condition may vary, depending upon the shape of the decomposition chamber, and is suitably from 50 to 100 rpm. If the stirring is too strong, the meat material would be emulsified with the components of fats and oils, often resulting in the interference in the enzyme-decomposing reaction. If, on the contrary, the stirring is too weak, the dispersion of the raw material mixture would be poor, also resulting in the retardation of the decomposition reaction.

When the autolyzing decomposition reaction rate has reached the maximum value under the above-mentioned condition, for example, in about 30 to 120 minutes after the stabilization of the determined condition in the case of the processing of fishes and shellfishes, or in about 40 to 180 minutes in the case of the processing of meats of birds, beasts or whales, an appropriate amount of other protein-decomposing enzymes are added by selecting the time when the initial autolysis of the raw material proteins is maximum.

The enzymes to be added later are those derived from animals, plants and microorganisms, and any protein-decomposing enzymes can be used singly or in the form of mixture, including, for example, pepsin, rennin, trypsin, chymotrypsin, papain, ficin, bromelain, etc. as well as bacterial protease, mould protease, ray fungal protease, etc. The amount of the enzymes to be added is properly determined in accordance with the kind of the raw material meats to be processes and the kind of the enzymes to be used, and in general, the enzymes are used in a concentration falling within the range of from 0.01% to 1.0%. The optimum pH range of the solution to be processed is determined in accordance with the enzymes as used, and it preferably falls within a neutral to acidic range. The reaction temperature can be freely selected from a temperature range at which the autolyzing enzymes do not activate, and in general, the reaction is carried out at 20° to 60° C.

In general, 1 to 30 hours are required for enzyme decomposition. However, the enzyme decomposition is necessary to be carried out within 3 to 20 hours for the purpose of attaining the concentrated formation of the low molecular weight peptides in accordance with the method of the present invention. If the reaction time is too short or, on the contrary, if the reaction time is too long, peptides having a molecular weight of a broad range would be formed or a noticeable amount of amino acids would be formed. Accordingly, as the raw material meats have different protein compositions about the kinds thereof, it is necessary to previously surely confirm the most suitable decomposition-terminating point under the above-mentioned decomposition condition with respect to the raw material meats to be processed.

After the completion of the decomposition reaction, the pH of the decomposed solution is immediately controlled to be come neutral or slightly acidic (for example, pH of 5 to 7), and then the solution is rapidly heated and kept at a temperature of 80° C. or higher for 10 to 30 minutes whereby the enzymes are deactivated.

After the heat treatment, the solution thus processed is subjected to screening, centrifugation or the like so as to mechanically separate and remove any insoluble substances, coagulated substances, fats and oils, etc. therefrom. The thus separated solution is processed for concentration to obtain a concentrated solution which consists mainly of delicious yellow-bron peptides having a good aroma and an enhanced flavour as derived from the raw material meats. The concentration can be carried out at normal pressure or under reduced pressure. However, too longer treatment at a high temperature would result in the progress of the pyrolysis of peptides often to cause the increase of the formation of amino acids or the generation of some bad smell. Accordingly, the concentration treatment is required to be carried out continuously in a shortest period of time, and further, the solution must not be kept boiling for a long period of time.

The concentrated solution thus obtained, which consists mainly of peptides having a molecular weight of a low molecular range, is a delicious liquid which is hardly bitter and is rich in "umami", and this can directly be utilized in foods, materials of medicinal products or seasonings. Further, this can be processed in the next step and can be made into a more tastable food material. Specifically, a free amino acid is bonded with the low molecular peptides formed in the next step, whereby the umami and the tastable sweetness are intensified further. This step proceeds, following the reaction of synthesizing proteinaceous substances from low molecular weight peptides with a protease catalyst (plastein reaction). In the method of the present invention, any expensive endopeptidase is not specifically utilized but the autolyzing enzyme-containing reaction solution, which is obtainable in the previous reaction step, can be partly added, or without the addition of the said reaction solution, an amino acid can be bonded to the low molecular weight peptides by suitably regulating the reaction condition.

In the case of the addition of the autolyzing enzyme-containing reaction solution, the concentration of the peptide-containing concentrated solution, as formed in the previous step, is controlled to be from 15 to 50% by weight, preferably from 20 to 40% by weight, and the pH value thereof is controlled to be from 5.0 to 7.0, preferably from 6.0 to 6.5, and the reaction solution in which the enzymes used in the previous step are not deactivated is added to the said concentrated solution in an amount of from 1 to 10 % by weight while an appropriate amount (for example, from 0.1 to 20 % by weight) of an amino acid is also added thereto. Next, the reaction mixture is kept at 30° to 65° C. for 15 to 120 minutes and then heated at 85° C. or higher so that the enzymes are deactivated. As the case may be, the reaction mixture can be reacted further for a longer period of time, whereupon the peptide concentration is required to be kept higher so as to preserve the reaction mixture from decay.

Thus, a desired amino acid can be bonded with the low molecular peptides by utilizing the autolyzing enzymes so as to completely remove the bitterness and roughness of the peptides, whereby a peptide-containing solution having an extremely improved and enriched taste can be obtained.

Next, in the case of improving and enriching the taste of the peptide-containing solution without the use of the autolyzing enzymes, the peptide concentration and the reaction temperature are to be elevated higher than those in the above-mentioned method, and further, the reaction is required to be initiated directly after the completion of the concentration treatment. Specifically, the peptide concentration is to be concentrated to 10 % by weight or more, and, without lowering the temperature of the reaction solution, the pH value of the solution is controlled to be from 5.0 to 7.0, preferably from 6.0 to 6.5, and, while the solution is kept to be continuously stirred at 60° to 90° C., an amino acid to be bonded, for example, glutamic acid, glycine, alanine, aspartic acid or the like, is added to the peptide-containing solution in an amount of from 0.1 to 20 % by weight and the reaction is carried out further. In this step, in case a hydrophobic amino acid such as leucine, valine or the like is added or the concentration of the amino acid added has become to be nearly saturated, some white precipitate would be formed. Therefore, it is important to determine the amount of the amino acid to be added in careful consideration of the solubility of the amino acid and the concentration of the peptide-containing solution. After the completion of the reaction in 15 to 120 minutes, the temperature of the solution is gradually lowered to 10° to 30° C., while the solution is kept to be continuously stirred, so that the reaction is stabilized.

According to this method, the concentration of the peptides and amino acids contained in the resulting solution is high, and therefore, it is presumed that not only covalent bond but also hydrogen bond and ionic bond would be formed between them. Accordingly, the thus obtained reaction solution can have not only the enhanced flavour of the low molecular weight peptides but also the extremely enriched umami because of the synergestic effect of the peptides and the newly bonded amino acids.

In the previous protein-decomposition step, peptides which have a noticeable amount of surface hydrophobic groups would often be formed, depending upon the kind of the protein-decomposing enzymes as used in the said step. However, the solubility of the said peptides can be intensified by the addition of a hydrophilic amino acid such as glutamic acid, and therefore, the bitterness and roughness of the hydrophobic peptides can completely be eliminated, and the tastability of the peptide-containing solution can be extremely improved.

The liquid substance thus formed is colored in yellow-brown, and after concentrated, this becomes a viscous extract, which has both the aroma and the taste of the raw material meats and is extremely delicious. This liquid substance can be utilized for foods, seasonings and materials of medicinal goods of broad ranges, directly or after dried and powdered.

As explained in detail hereinabove, the method of the present invention is characterized by the addition of other enzymes which can react on a meat matter of such kind as containing peptide bond that could not be cut by the autolyzing enzymes contained in the raw material meat, during the procedure of the autolysis reaction, especially when the reaction speed of the said autolysis reaction has reached the maximum value, while the protein-decomposing activity of the said autolyzing enzymes as existing in the raw material meat is being kept active. By the addition of the said enzymes, the complementary and synergestic effect of the autolyizng enzymes and the added enzymes can realize the uniform protein-decomposition of the raw material meat, whereby high molecular peptides of various kinds as contained in the raw material meat are converted into peptides having a molecular weight of a low molecular weight range. Thus, the present inventors have achieved the formation of a reaction solution containing an overwhelming majority of low molecular weight peptides and thus have achieved the formation of tastable matters which satisfy the initial object of the present invention and which have both the aroma and the umami of the raw material meats.

In addition, if the tastable matters thus obtained still are bitter or rough, the bitterness or roughness can completely be eliminated by the addition of both the reaction solution of the autolyzing enzymes and an amino acid or by the single addition of an amino acid only to the said tastable matter.

Accordingly, the tastable matters as obtained by the method of the present invention can be utilized as extremely excellent food additives or seasonings. In addition, the method of the present invention is valuable for effective utilization of various kinds of raw meat materials.

The following examples are intended to illustrate the present invention in greater detail but not to limit it in any way.

EXAMPLE 1

A fresh "eso" (white fish meat as a raw materials of a boiled fish paste) was washed with water and cut with a meat-cutter to separate the meat matter therefrom. This was pulverized and 10 Kg of the pulverized matter was weighed. This was put in a stirring and decomposing chamber, and after 10 kg of water was added thereto, the whole was stirred at 70 to 80 rpm and the pH of the resulting solution was adjusted to 5.5. Afterwards, the temperature of the solution was gradually elevated up to 45° to 50° C. and the solution was kept to be stirred continuously at the said temperature. After 60 minutes, the fluidity of the complete solution became smooth, and a small amount of the solution was sampled at the said point, which was called a reaction solution (A).

Next, after the pH of the solution was adjusted to 4.1, a 0.1 % solution of Denazyme (trade name of commercial protease product) was added thereto and reacted at 45° to 50° C. for 4 hours. After neutralized, the solution was heated and kept to be boiled for 10 minutes so that the enzyme was deactivated. This was centrifuged with a screen centrifugal separator to remove the insoluble matters, fish oils, etc. therefrom, whereby about 16 kg of a purified and separated solution was obtained. Next, this was concentrated under normal pressure to obtain a peptide-containing solution having a concentration of 25 Bx, which was called a reaction solution (B).

Each of the reaction solutions (A) and (B) was defatted and filtrated with a centrifugal separator and then subjected to gel-chromatography with Sephadex G—50 and G—25. By the chromatography, fractions each having a molecular weight of 6500 or more, a molecular weight of 1300 or less and the intermediate molecular weight therebetween were fractionated on the basis of the elution point of a standard peptide having a known molecular weight, and the peptide determination of each fraction was carried out in accordance with a copper-Folin's reaction.

As a result, the reaction solution (A) was confirmed to comprise a high molecular weight peptides having a molecular weight of 6500 or more, in a content of 80 % or more, and the gel-chromatogram thereof with Sephadex G—50 almost showed a broad form. On the other hand, as a result of the fractionation of the reaction solution (B) with Sephadex G—25, a sharp chromatograph was obtained having peaks nearly at 2000 to 1300, which indicated that the content of peptides having a molecular weight of more than 6500 was 17%, that of peptides having a molecular weight of from 6500 to 1300 was 58%, and that of peptides having a molecular weight of less than 1300 was 25%. In addition, the reaction solution (B) was far more delicious than the reaction solution (A) with respect to the tastability, and the reaction solution (B) was an extremely tastable solution with good body, which had the native aroma and tast of the raw material white fish meat.

EXAMPLE 2

100 ml of the reaction solution (A) and 1000 ml of the reaction solution (B) as obtained in the Example 1 were blended, and 60 g of glutamic acid was added thereto for complete dissolution. Next, the pH of the resulting solution was controlled to be 6.0, while temperature thereof was kept at about 50° C., and the solution was stirred and reacted fro 30 minutes. After the reaction, the solution was once heated at 85° to 90° C. to deactivate the enzymes therein and then this was gradually cooled while stirred. The insoluble matters were removed through a screen and the liquid substance thus obtained was yellow-brown and somewhat viscous. This was more delicious than the reaction solution (B) which did not contain the amino acid bond, and this was an extremely thick and tastable matter having the native aroms and taste of the raw material white fish meat.

EXAMPLE 3

Disabled chickens were killed and immediately the feathers, skins, heads, leg toes and internal organs thereof were removed to obtain the bone and meat part of good quality. These were minced with a mincing machine and 10 kg of the minced matter was weighted. This was put in a stirring and decomposing chamber together with 15 kg of a pure water and stirred at about 80 rpm, whereupon the pH of the resulting liquid was adjusted to 5.0. Next, this was heated and stirred for about 80 minutes while kept at 45° to 50° C.

After the complete solution was confirmed to be a uniform, smooth and liquid state, the pH thereof was adjusted to 4.1. Next, a 0.2 % solution of Denazyme (commercial protease product) as dissolved in water was added thereto and reacted for 5 hours while still kept at 45° to 50° C. After the reaction, the resulting solution was neutralized and the temperature of the solution was elavated, and the solution was boiled for 10 minutes so that the enzymes were deactivated. Next, the solution was spontaneously cooled and the insoluble substances and fats and oils were separated out therefrom by screen-centrifugation. Thus, 19 kg of a purified and separated solution was obtained.

The purified and separated solution was concentrated under normal pressure to give about 4 kg of a concentrated solution which was pale yellow-brown and transparent. This solution was an extremely delicious tastable solution having the native aroma and taste of the raw material chicken meat. Just after the completion of the concentration of the solution, this was kept to have a pH of 6.0 and a liquid temperature of 85° C., and 0.2 kg of alanine was added thereto, while being continuously stirred. After the complete dissolution, the liquid was confirmed to become transparent, and then this was spontaneously cooled to normal temperature while being stirred continuously. Thus, a delicious and thick tastable matter extract was obtained, having the native aroma and taste of the raw material chicken meat.

0.75 kg of dextrin, as a binder, was added to the extract matter and dried with a spray drier to obtain 2.1 kg of a powdered matter. This powdered matter was colored in pale yellow and had an extremely thick and delicious taste. An extremely tastable chicken soup was obtained by dissolving the said powder in a hot water to form a liquid of 1.5 % concentration.

What is claimed is:

1. A method for preparation of tastable matters consisting primarily of low molecular weight peptides, which comprises:
   a first step of finely pulverizing a raw meat selected from the group consisting of fish, shellfish, bird and beast by mechanical means;
   a second step of decomposing the pulverized meat with autolyzing enzymes of said pulverized meat under the following conditions defined by a procedure comprising:
   (a) placing the meat in a decomposing chamber,
   (b) adding water in an amount of from 50 to 200% of the meat,
   (c) stirring the resulting meat solution at a rotational speed of from 50 to 100 rpm.
   (d) adjusting the pH value of the resulting meat solution within a range of approximately 3 to 6.5, and
   (e) controlling the temperature of the meat solution within a range of approximately 20° to 60° C.; and, thereafter, a third step of adding to the decomposed product of said second step additional protein-decomposing enzymes at a subsequent time defined by one of:
   (a) in case the meat is classified as fish or shellfish within, 30 to 120 minutes after completion of said procedure in said second step, or
   (b) in case the meat is classified as bird or beast within 40 to 180 minutes after completion of said procedure in said second step;

so that protein-decomposing reactions by the added enzymes and the autolyzing enzymes proceed simultaneously under said conditions, a fourth step of deactivating both said enzymes followed by purifying and concentrating the resulting solution;

a fifth step of adding decomposed product as obtained in the previous second step and amino acids to the concentrated solution as obtained in the fourth step each in a proper amount so that the reaction of said concentrated solution is again initiated in order to bond low molecular weight peptides to the amino acids; and a sixth step of deactivating said enzymes in the product of said fifth step.

2. A method for preparation of tastable matters consisting primarily of low molecular weight peptides as claimed in claim 1, in which the concentration of the concentrated solution is from 15 to 50 % by weight and the pH thereof is from 5.0 to 7.0.

3. A method for preparation of tastable matters consisting primarily of low molecular weight peptides as claimed in claim 2, in which the concentration of the concentrated solution is from 20 to 40 % by weight.

4. A method for preparation of tastable matters consisting primarily of low molecular weight peptides as claimed in claim 2, in which the pH value of the concentrated solution is from 6.0 to 6.5.

5. A method for preparation of tastable matters consisting primarily of low molecular weight peptides as claimed in claim 1, in which the amount of the solution containing the autolyzing enzymes is from 0.1 to 10% by weight.

6. A method for preparation of tastable matters consisting primarily of low molecular weight peptides as claimed in claim 1, in which the amount of the amino acids to be added is from 1 to 20 % by weight.

7. A method for preparation of tastable matters consisting primarily of low molecular weight peptides as claimed in claim 1, in which the reaction condition in order to bond the resulting low molecular weight peptides to the amino acids in the fifth step comprises a reaction temperature of from 30° to 65° C. and a reaction period of from 15 to 120 minutes.

8. A method for preparation of tastable matters consisting primarily of low molecular weight peptides, which comprises:

a first step of finely pulverizing a raw meat selected from the group consisting of fish, shellfish, bird and beast by mechanical means;

a second step of decomposing the pulverized meat with autolyzing enzymes of said pulverized meat under the following conditions defined by a procedure comprising:

(a) placing the pulverized meat in a decomposing chamber, (b) adding water to the pulverized meat in an amount of from 50 to 200% of the pulverized meat, (c) stirring the resulting meat solution at a rotational speed of from 50 to 100 rpm, (d) adjusting the pH value of the resulting meat solution within a range of approximately 3 to 6.5, and (e) controlling the temperature of the meat solution within a range of approximately 20° to 60° C., and thereafter a third step of adding additional protein-decomposing enzymes to the decomposed product of said second step at a subsequent time defined by one of:

(a) in case the meat is classified as fish or shellfish, 30 to 120 minutes after completion of said procedure in said second step or (b) in case the meat is classified as bird or beast, within 40 to 180 minutes after completion of said procedure in said second step, so that the protein-decomposition reactions by both the added enzymes and the autolyzing enzymes proceeds simultaneously under said conditions;

a fourth step of deactivating both said enzymes followed by purifying and concentrating the resulting solution; and a fifth step of adding amino acids directly to the thus concentrated solution, while the solution is continuously stirred without the temperature thereof being lowered so that the reaction of the solution is again initiated in order to bond the resulting low molecular weight peptides in said solution to the amino acids.

9. A method for preparation of tastable matters consisting primarily of low molecular weight peptides as claimed in claim 8, in which the concentration of the concentrated solution is controlled to be 15 % by weight or more.

10. A method for preparation of tastable matters consisting primarily of low molecular weight peptides as claimed in claim 8, in which the temperature of the concentrated solution is controlled to be from 60° to 90° C.

11. A method for preparation of tastable matters consisting mainly of low molecular weight peptides as claimed in claim 8, further comprising controlling the pH value of the concentrated solution within the range from 5.0 to 7.0.

12. A method for preparation of tastable matters consisting primarily of low molecular weight peptides as claimed in claim 11, in which the pH value of the concentrated is controlled to be from 6.0 to 6.5.

13. A method for preparation of tastable matters consisting primarily of low molecular weight peptides as claimed in claim 8, in which the concentration of the amino acid to be added is determined in relation to the concentration of the concentrated solution, and the amino acid concentration is from 0.1 to 20 % by weight.

14. A method for preparation of tastable matters consisting primarily of low molecular weight peptides as claimed in claim 8, in which the the reaction time required in order to bond the resulting low molecular weight peptides in the solutions to the amino acids, is from 15 to 120 minutes, and after the laspe of the said time, the temperature is gradually lowered to room temperature, while the reaction is stirred continuously, and then terminating the reaction.

15. A method for preparation of tasteable matters consisting primarily of low molecular weight peptides, which comprises:

(A) a step of finely pulverizing a raw meat selected from the group consisting of fish shellfish, bird and beast by mechanical means;

(B) a step of decomposing the pulverized meat with autolyzing enzymes of said pulverized meat under the following conditions defined by a procedure comprising:

(a) placing the pulverized meat in a decomposing chamber, (b) adding water to the pulverized meat in an amount of from 50 to 200% of the meat, (c) stirring the resulting meat solution at a rotational speed of from 50 to 100 rpm, (d) adjusting the pH value of the resulting meat solution within a range of approximately 3 to 6.5, and (e) controlling the temperature of the meat solution within a range of approximately 20° to 60° C.

(C) and thereafter, a step of adding additional protein-decomposing enzymes to the decomposed product of step B with the autolyzing enzymes at a subsequent time defined by one of:

(a) in case the meat is classified of fish or shellfish within 30 to 120 minutes after completion of said procedure in step B or (b) in case the meat is classified of bird or beast within 40 to 180 minutes after completion of said procedure in step B; so that the protein-decomposing reactions by the added enzymes and the autolyzing enzymes may proceed simultaneously under said conditions; and (D) a step of deactivating both said enzymes followed by purifying and concentrating the resulting tasteable matters containing low molecular weight peptides having a molecular weight of 200 to 3000.

16. A method for preparation of tastable matters consisting primarily of low molecular weight peptides as claimed in claim 15, in which said temperature is controlled to be from 40° to 55° C. in step B.

17. A method for preparation of tastable matters consisting primarily of low molecular weight peptides as claimed in claim 15, in which the enzyme to be added is selected from the group consisting of pepsin, rennin, trypsin, chymotrypsin, papain, ficin, bromelain, bacterial protease, mould protease and ray fungal protease, the said enzymes being used singly or in the form of a mixture thereof.

18. A method for preparation of tastable matters consisting primarily of low molecular weight peptides as claimed in claim 15, in which the amount of the enzyme to be added is from 0.01 to 1.0 % concentration.

19. A method for preparation of tastable matters consisting primarily of low molecular weight peptides as claimed in claim 15, in which the pH value is adjusted to be neutral to acidic after the addition of the additional enzyme.

20. A method for preparation of tastable matters consisting primarily of low molecular weight peptides as claimed in claim 15, in whcih the time for the reaction after the addition of the additional enzyme is controlled within the range of from 1 to 20 hours.

21. A method for preparation of tastable matters consisting primarily of low molecular weight peptides as claimed in claim 15, in which the product of step C is adjusted to be neutral to weakly acidic, having a pH value of from 5 to 7, and then heated at a temperature of 80° C. or higher for 10 to 30 minutes, for deactivating the enzymes.

* * * * *

UNITED STATES PATENT AND TRADEMARK OFFICE
CERTIFICATE OF CORRECTION

PATENT NO. : 4,853,231

DATED : August 1, 1989

INVENTOR(S) : Kazuharu Osajima and Katsuhiro Osajima

It is certified that error appears in the above-identified patent and that said Letters Patent is hereby corrected as shown below:

Please make the following corrections:

Change Column 5, Line 16 from "$0°$ to $60°C.$," to

-- $-20°$ to $60°C.$, --

Signed and Sealed this

First Day of January, 1991

Attest:

HARRY F. MANBECK, JR.

Attesting Officer

Commissioner of Patents and Trademarks